(12) United States Patent
Gang et al.

(10) Patent No.: US 7,774,410 B2
(45) Date of Patent: Aug. 10, 2010

(54) HANDLING A MULTIMEDIA OBJECT ASSOCIATED WITH AN ELECTRONIC MESSAGE

(75) Inventors: David Gang, Oakton, VA (US); Barry Appelman, McLean, VA (US)

(73) Assignee: AOL Inc., Dulles, VA (US)

( * ) Notice: Subject to any disclaimer, the term of this patent is extended or adjusted under 35 U.S.C. 154(b) by 1967 days.

(21) Appl. No.: 10/715,210

(22) Filed: Nov. 18, 2003

(65) Prior Publication Data

US 2004/0153517 A1    Aug. 5, 2004

Related U.S. Application Data

(60) Provisional application No. 60/426,806, filed on Nov. 18, 2002, provisional application No. 60/427,957, filed on Nov. 21, 2002, provisional application No. 60/488,376, filed on Jul. 21, 2003, provisional application No. 60/488,749, filed on Jul. 22, 2003.

(51) Int. Cl.
*G06F 15/16* (2006.01)
*G06F 15/167* (2006.01)
(52) U.S. Cl. .................. 709/206; 709/216; 709/219
(58) Field of Classification Search .............. None
See application file for complete search history.

(56) References Cited

U.S. PATENT DOCUMENTS

| 6,337,712 | B1 | 1/2002 | Shiota et al. |
| 6,512,570 | B2 | 1/2003 | Garfinkle et al. |
| 6,535,228 | B1 | 3/2003 | Bandaru et al. |
| 6,583,799 | B1 | 6/2003 | Manolis et al. |
| 6,701,351 | B1 | 3/2004 | Gann |
| 6,856,999 | B2 * | 2/2005 | Flanagin et al. .......... 707/103 Y |
| 7,003,551 | B2 * | 2/2006 | Malik ........................ 709/206 |
| 7,257,639 | B1 * | 8/2007 | Li et al. ..................... 709/232 |
| 2002/0016818 | A1 | 2/2002 | Kirani et al. |
| 2002/0049847 | A1 * | 4/2002 | McArdle et al. ........... 709/227 |
| 2002/0049852 | A1 | 4/2002 | Lee et al. |
| 2002/0184309 | A1 | 12/2002 | Danker et al. |

* cited by examiner

*Primary Examiner*—John B. Walsh
(74) *Attorney, Agent, or Firm*—Finnegan, Henderson, Farabow, Garrett & Dunner, LLP

(57) ABSTRACT

Automatically saving communicated multimedia objects to a repository for subsequent use includes in response to a sent electronic message and a received electronic message, identifying an embedded multimedia object or an attached multimedia object. The embedded multimedia object or the attached multimedia object is separated from the electronic message. The separated multimedia object is automatically saved to a repository for subsequent use by a user and the user is able to select the multimedia object from the repository for subsequent use.

37 Claims, 6 Drawing Sheets

400

HANDLING A MULTIMEDIA OBJECT ASSOCIATED WITH AN ELECTRONIC MESSAGE

CROSS REFERENCE TO RELATED APPLICATIONS

This application claims the benefit of U.S. Provisional Application No. 60/426,806, filed Nov. 18, 2002, and titled "Software Enabling and Enhancing Communications and Functionality At A Client Computer," and claims the benefit of U.S. Provisional Application No. 60/427,957, filed Nov. 21, 2002, and titled "Image Finder for Selection and Rotation of Images in E-Mail," and U.S. Provisional Application No. 60/488,376, filed Jul. 21, 2003, and titled "Client Software Enabling Communications Between A Client Computer and Internet Service Provider Host Computer," and U.S. Provisional Application No. 60/488,749, filed Jul. 22, 2003, and titled "Client Software Enabling Communications Between A Client Computer and Internet Service Provider Host Computer," all of which are incorporated by reference.

TECHNICAL FIELD

This document relates to handling a multimedia object associated with an electronic message.

BACKGROUND

Electronic messages often include embedded or attached objects such as multimedia objects. Objects that have been sent and received may be made available outside the context of the message in which they are communicated. However, conventional processes for identifying and making accessible an embedded or attached object generally have required manual actions by a user, rendering them cumbersome and inconsistent.

SUMMARY

In one general aspect, automatically saving communicated multimedia objects to a repository for subsequent use includes in response to a sent electronic message and a received electronic message, identifying an embedded multimedia object or an attached multimedia object. The embedded multimedia object or the attached multimedia object is separated from the electronic message. The separated multimedia object is automatically saved to a repository for subsequent use by a user and the user is able to select the multimedia object from the repository for subsequent use.

Implementations may include one or more of the following features. For example, the repository may include a central repository and/or a local repository.

In one implementation, a type of the multimedia object may be determined and the multimedia object may automatically be saved to the repository based on the determination of the type of the multimedia object.

In another implementation, a type of the multimedia object may be determined and the multimedia object may not automatically saved to the repository based on the determination of the type of the multimedia object.

The type of the multimedia object may include a non-picture image. The non-picture image may include an emoticon. The multimedia object may include an image. The image may include a picture. The multimedia object may include a music file. The multimedia object may include a video file.

In one implementation, enabling the user to select the multimedia object from the repository for subsequent use may include enabling the user to send the multimedia object to other users using a graphical user interface.

In another implementation, enabling the user to select the multimedia object from the repository for subsequent use may include enabling the user to send the multimedia object to others across multiple applications using a graphical user interface that is common to the multiple applications. The multiple applications may include an instant messaging application, a member directory, and/or a web page publishing application.

In another implementation, the automatically saved multimedia object may be available for use across multiple applications using a graphical user interface that is common to the multiple applications. The multiple applications may include an instant messaging application, a member directory, and/or a web page publishing application.

The sent electronic message and the received electronic message may include electronic mail.

Enabling the user to select the multimedia object from the repository for subsequent use may include enabling the user to select and use the multimedia object in multiple applications without having to upload the multimedia object to the repository. Prior to automatically saving the multimedia object a determination may be made whether the multimedia object is stored in the repository. The multimedia object may be automatically stored in the repository if the multimedia object is not stored in the repository based on the determination. The multimedia object may not automatically be stored in the repository if the multimedia object is stored in the repository based on the determination.

These general and specific aspects may be implemented using a system, a method, or a computer program, or any combination of systems, methods, and computer programs.

Other features will be apparent from the description and drawings, and from the claims.

DESCRIPTION OF DRAWINGS

Like reference symbols in the various drawings may indicate like elements.

DETAILED DESCRIPTION

Figure 1:
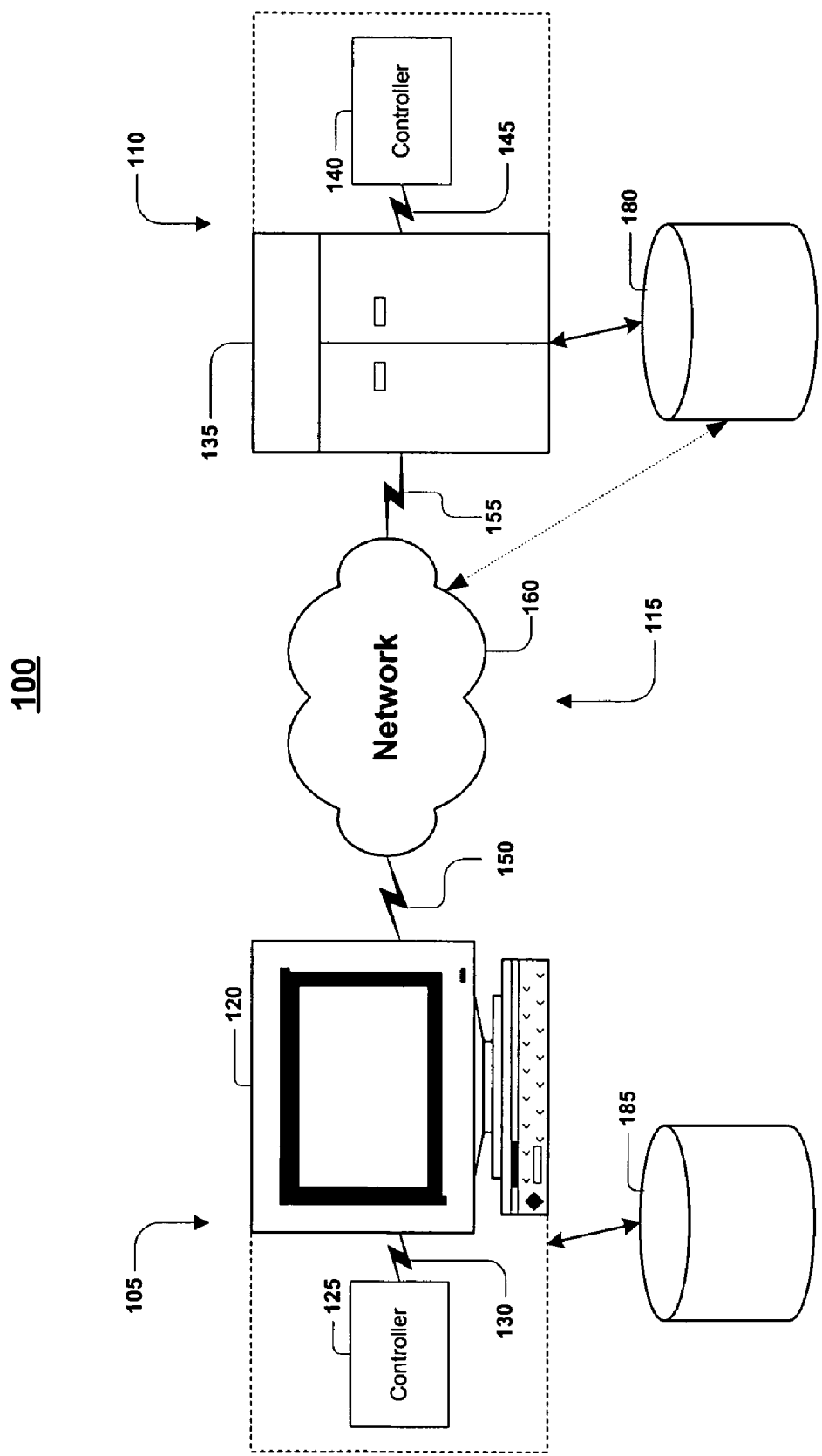
FIG. 1 is a block diagram of a communications system.

Through the concepts and implementations described in this document, multimedia objects that are either embedded within or attached to any incoming or outgoing electronic message may be automatically identified and thereafter saved in a repository for subsequent use/access by a user. The multimedia objects may be separated from the electronic message and saved in the repository separate from the electronic message. A graphical user interface may be used to enable the user to select the saved multimedia object and to use it repeatedly in another electronic message or in another type of application where multimedia objects may be shared. In this manner, the embedded and/or attached multimedia objects may be easily and reliably identified and reused.

A multimedia object may include a picture image, a non-picture image (e.g., an emoticon), an audio file, and/or a video file. Each different type of multimedia object may be stored in one or more format types that may differ from format types used to store other object types. For example, picture images may be stored in different formats such as JPEG (Joint Photographic Experts Group), GIF (Global Interchange Format), BMP (Bitmap File Format), TIFF (Tagged Image File Format), TIFF JPEG, and JFIF (JPEG File Interchange Format). By contrast, audio files may be stored in different audio formats such as WAV (Waveform audio format), MP3 (MPEG ("Moving Picture Experts Group") Audio Layer-3), WMA (Windows Media Audio), and AIFF. Moreover, video files may be stored in different video formats such as MPEG, AVI (Audio Video Interleaved), ASF (Advanced Streaming Format), and WMV (Windows Media Video).

In one exemplary implementation, the multimedia objects may be automatically saved to a central repository, a local repository, both a central and a local repository, or a combination of a central repository and a local repository.

In addition to saving the multimedia object in the repository, other information related to the multimedia object also may be stored. For example, metadata for each of the types of multimedia objects or a collection or group of multimedia objects also may be saved in the repository. Some of the metadata may be displayed when the multimedia object is accessed from the repository. Other metadata may be saved but not displayed when the multimedia object is accessed from the repository. More specifically, for instance, metadata for each multimedia object may include information about each object such as, the date the multimedia object was sent and/or received, a subject line from the electronic message, a name of the sender of the electronic message, and one or more recipients of the electronic message. In some instances, a history of the metadata may be saved with the multimedia object and in other instances only the most recent or some subset of metadata may be saved.

With respect to image multimedia objects, examples of metadata that may be saved but not displayed include an image height, an image width, available resolutions, an original file name of the image, and an identifier that may be used to prevent duplicate images from being saved in the repository.

With respect to other multimedia objects, such as audio and video objects, examples of metadata that may be saved but not displayed include a file size, bit rate information, a playing duration of the object, an original file name of the object, and an identifier that may be used to prevent duplicate audio and video objects from being saved in the repository.

Figure 2:
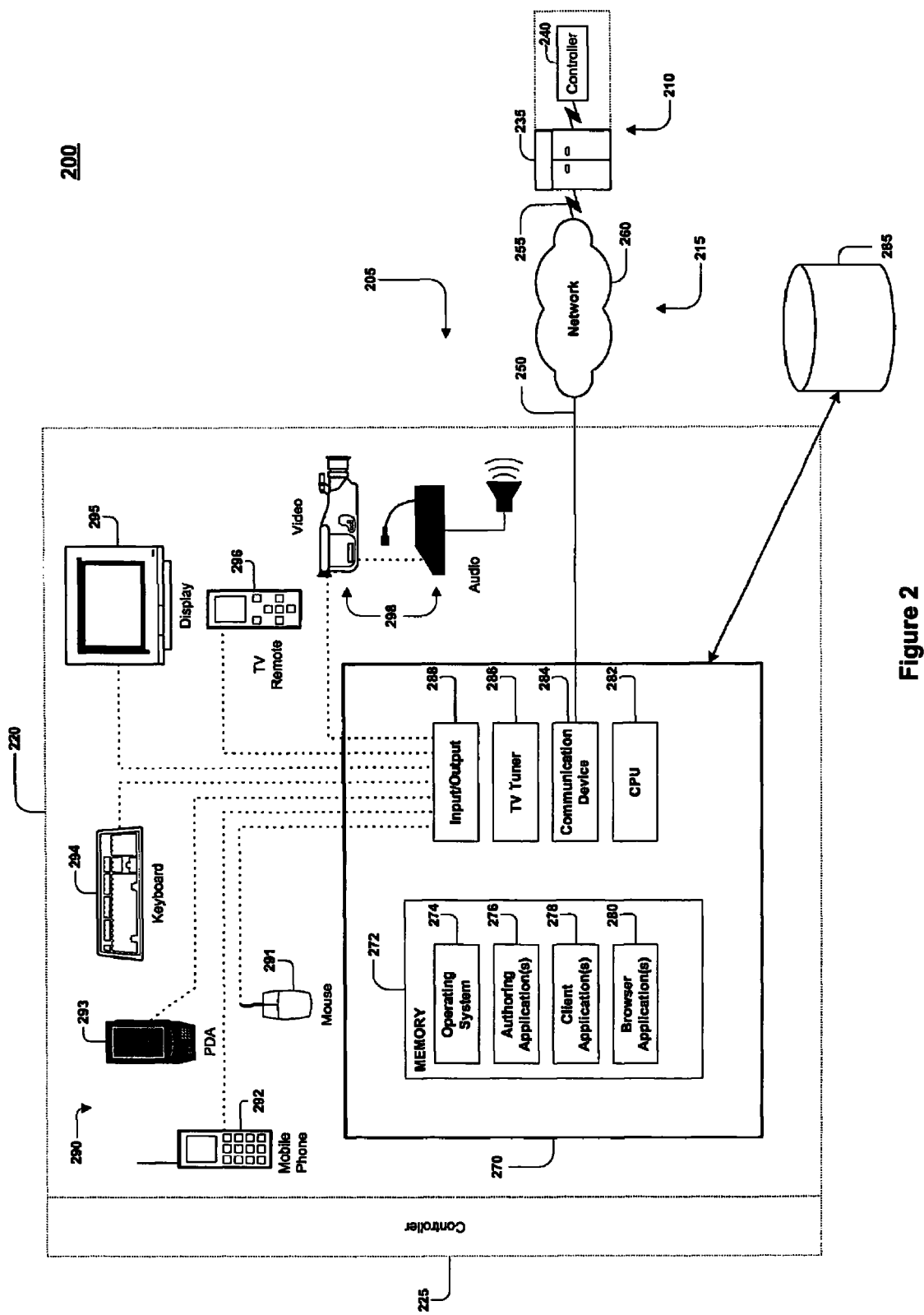
FIGS. 2 and 3 are expansions of the block diagram of FIG. 1.
Figure 3:
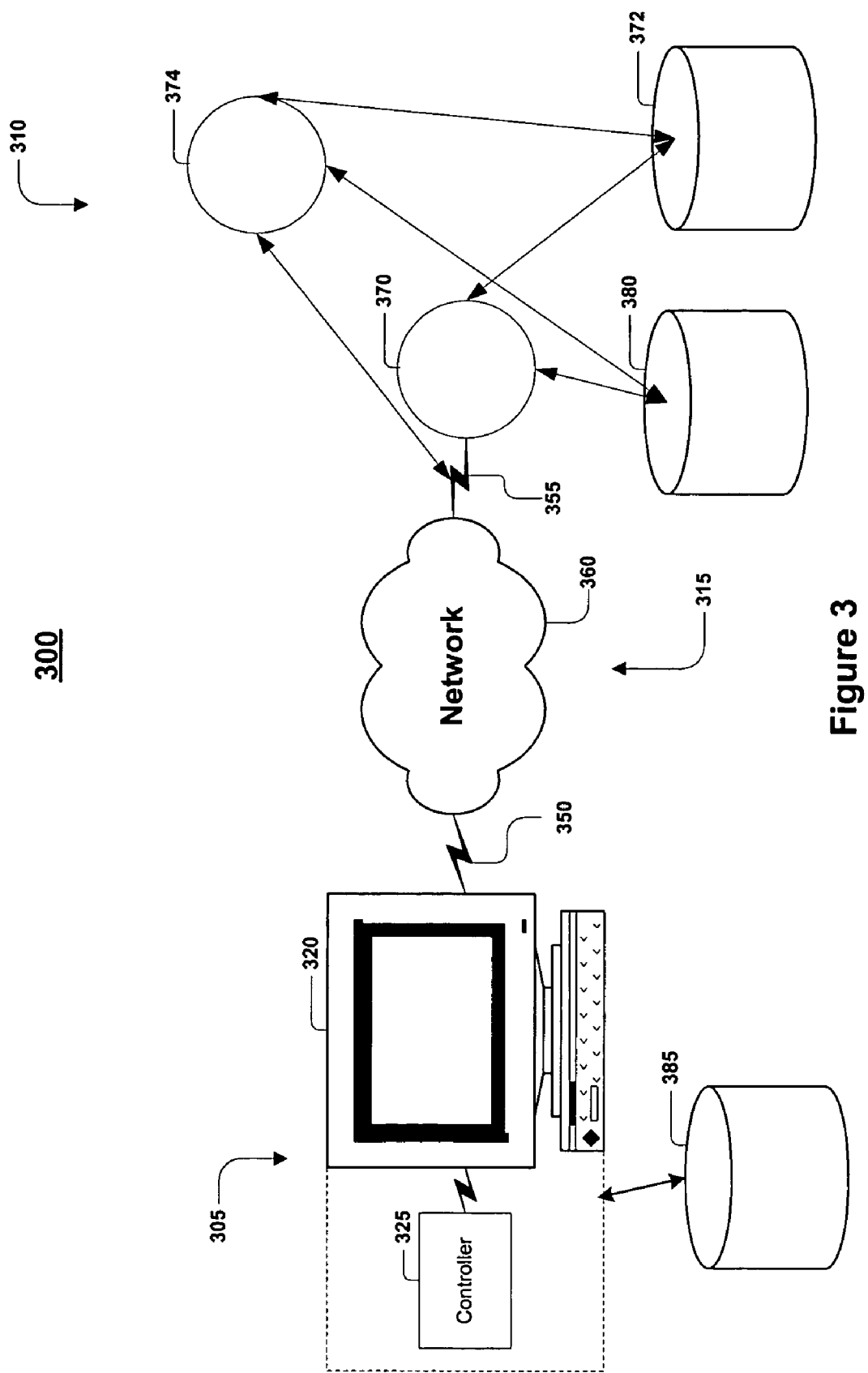

For illustrative purposes, FIGS. 1-3 show an example of a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

Referring to FIG. 1, a communications system 100 is capable of delivering and exchanging data between a requestor system 105 and a provider system 110 through a communications link 115. The requester system 105 may include a client system and the provider system 110 may include a host system. The requestor system 105 typically includes one or more requestor devices 120 and/or requestor controllers 125, and the provider system 110 typically includes one or more provider devices 135 and/or provider controllers 140. For example, the requestor system 105 or the provider system 110 may include one or more general-purpose computers (e.g., personal computers), one or more special-purpose computers (e.g., devices specifically programmed to communicate with each other and/or the requestor system 105 or the provider system 110), or a combination of one or more general-purpose computers and one or more special-purpose computers. The requestor system 105 and the provider system 110 may be arranged to operate within or in concert with one or more other systems, such as, for example, one or more Local Area Networks ("LANs") and/or one or more Wide Area Networks ("WANs").

The provider system 110 may include a communication interface such as an electronic mail gateway. For instance, the provider system 110 may include a dedicated mailing system that is implemented by specialized hardware or executed by a general purpose processor capable of running various applications, such as electronic mailer programs, and capable of employing various file transfer protocols, such as the Simple Mail Transfer Protocol ("SMTP"). The communications interface of provider system 110 enables communications between the provider system 110 and other systems through, for example, communications link 115.

The requester device 120 (or the provider device 135) is generally capable of executing instructions under the command of a requestor controller 125 (or a provider controller 140). The requestor device 120 (or the provider device 135) is connected to the requestor controller 125 (or the provider controller 140) by a wired or wireless data pathway 130 or 145 capable of delivering data.

The requestor device 120, the requestor controller 125, the provider device 135, and the provider controller 140 each typically include one or more hardware components and/or software components. An example of a requestor device 120 or a provider device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. The requestor device 120 and the provider device 135 may include devices that are capable of peer-to-peer communications.

An example of a requestor controller 125 or a provider controller 140 is a software application loaded on the requester device 120 or the provider device 135 for commanding and directing communications enabled by the requestor device 120 or the provider device 135. Other examples include a program, a piece of code, an instruction, a device, a computer, a computer system, or a combination thereof, for independently or collectively instructing the requestor device 120 or the provider device 135 to interact and operate as described. The requestor controller 125 and the provider controller 140 may be embodied permanently or temporarily in any type of machine, component, physical or virtual equipment, storage medium, or propagated signal capable of providing instructions to the requester device 120 or the provider device 135.

The communications link 115 typically includes a delivery network 160 making a direct or indirect communication between the requestor system 105 and the provider system 110, irrespective of physical separation. Examples of a delivery network 160 include the Internet, the World Wide Web, WANs, LANs, analog or digital wired and wireless telephone networks (e.g., PSTN, ISDN, and xDSL), radio, television, cable, satellite, and/or any other delivery mechanism for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

An electronic information store 180 may be connected to the provider system 110, included as a component of the provider system 110, and/or connected to the delivery network 160. The electronic information store 180 may be a repository for electronic information, including multimedia objects, that may be in an indexed, searchable, and/or viewable format.

Similarly, an electronic information store 185 may be connected to or included as a part of the requestor system 105. The electronic information store 185 may be a repository for electronic information, including multimedia objects, that may be indexed, searchable, and/or viewable.

In one implementation, objects stored in one of electronic information store 180 or electronic information store 185 may have corresponding metadata stored in the other of electronic information store 180 or electronic information store 185.

FIG. 2 illustrates a communications system 200 including a requestor system 205 communicating with a provider system 210 through a communications link 215. Requestor system 205 typically includes one or more requestor devices 220 and one or more requestor controllers 225 for controlling the requestor devices 220. Provider system 210 typically includes one or more provider devices 235 and one or more provider controllers 240 for controlling the provider devices 235. The communications link 215 may include communication pathways 250 and 255 that enable communications through the one or more delivery networks 260.

Examples of each element within the communications system of FIG. 2 are broadly described above with respect to FIG. 1. In particular, the provider system 210 and communications link 215 typically have attributes comparable to those described with respect to the provider system 110 and the communications link 115 of FIG. 1. Likewise, the requestor system 205 of FIG. 2 typically has attributes comparable to and illustrates one possible implementation of the requestor system 105 of FIG. 1.

The requestor device 220 typically includes a general-purpose computer 270 having an internal or external storage 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing programs, database programs, spreadsheet programs, calendar programs, or graphics programs) capable of generating documents or other electronic content; client applications 278 (e.g., stand alone e-mail client or AOL client, CompuServe client, AIM client, AOL TV client, or ISP client, all of which may include a built-in or embedded e-mail and/or instant messaging client) capable of communicating with other computer users, accessing various computer resources, and viewing, creating, or otherwise manipulating electronic content; browser applications 280 (e.g., Netscape's Navigator or Microsoft's Internet Explorer) capable of rendering standard Internet content and also capable of supporting a web-based e-mail and/or instant messaging client; and other applications such as a digital image sharing application.

The general-purpose computer 270 also includes a central processing unit 282 (CPU) for executing instructions in response to commands from the requestor controller 225. In one implementation, the requestor controller 225 includes one or more of the application programs installed on the internal or external storage 272 of the general-purpose computer 270. In another implementation, the requestor controller 225 includes application programs stored in and performed by one or more device(s) external to the general-purpose computer 270.

The general-purpose computer also includes a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV tuner 286 for receiving television programming in the form of broadcast, satellite, and/or cable TV signals. As a result, the requester device 220 can selectively and/or simultaneously display network content received by communications device 284 and television programming content received by the TV tuner 286.

The general-purpose computer 270 typically includes an input/output interface 288 for wired or wireless connection to various peripheral devices 290. Examples of peripheral devices 290 include, but are not limited to, a mouse 291, a mobile phone 292, a personal digital assistant 293 (PDA), a MP3 player (not shown), a keyboard 294, a display monitor 295 with or without a touch screen input, a TV remote control 296 for receiving information from and rendering information to subscribers, and an audiovisual input device 298.

Electronic data store 285 typically has attributes comparable to electronic data store 185 of FIG. 1. Electronic data store 285 may be connected to or contained within the requestor system 205. Electronic data store 285 may be an internal or external storage device.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the requestor device 220. For example, the mobile phone 292 or the PDA 293 may include computing and networking capabilities and function as a requestor device 220 by accessing the delivery network 260 and communicating with the provider system 210. Furthermore, the requestor system 205 may include one, some or all of the components and devices described above.

FIG. 3 illustrates a communications system 300 including a requestor system 305 communicating with a provider system 310 through a communications link 315. The requestor system 305 typically includes one or more requester devices 320 and one or more requestor controllers 325 for controlling the requestor devices 320. Provider system 310 typically includes a multimedia object process server 370, a multimedia access server 374, a multimedia object repository 380, and a metadata database 372. The communications link 315 may include communication pathways 350 and 355 that enable communications through the one or more delivery networks 360.

Examples of each element within the communications system of FIG. 3 are broadly described above with respect to FIGS. 1 and 2. In particular, the requestor system 305 and communications link 315 typically have attributes comparable to those described with respect to the requester system 105 and 205 and the communications link 115 and 215 of FIGS. 1 and 2. Likewise, the provider system 310 of FIG. 3 typically has attributes comparable to and illustrates one possible implementation of the provider system 110 and 210 of FIGS. 1 and 2.

The multimedia object process server 370 is configured to process communicated electronic messages. For electronic messages that have attached and/or embedded multimedia objects, the multimedia object process server 370 is configured to identify and separate the multimedia object from the electronic message and send the multimedia object to a repository for storage and subsequent access and/or use. In one exemplary implementation, the multimedia objects are stored in a central repository such as multimedia object repository 380. In another exemplary implementation, the multimedia objects may be stored in a repository that is local to the user, such as electronic data store 385. In one instance, the multimedia object may be separated from the electronic message and sent to the requester system 305 for storage in the electronic data store 385 through the delivery network 360. In another instance, the electronic message with the attached and/or embedded multimedia object may be forwarded by the multimedia object process server 370 to the requestor system 305 for the requestor system 305 to separate the multimedia object from the electronic message and store the multimedia object in the electronic data store 385.

As discussed above, the multimedia objects may be stored in both a central repository (e.g., multimedia object repository 380) and in a local repository (e.g., electronic data store 385) or a combination of a central repository and a local repository.

In one exemplary implementation, the multimedia object repositories may include multiple multimedia object repositories. For example, on multimedia object repository may be configured to store multimedia objects that have been designated for storage for subsequent access and/or use by a user and a separate multimedia object repository may be configured to store the attached and/or embedded multimedia objects that are automatically saved from sent and/or received electronic messages. The multiple multimedia object repositories may be linked to one another and access to the repositories may be through a common imaging toolset (e.g., a common GUI) that seamlessly integrates the multimedia objects from the repositories for the user.

The metadata that may be associated with each of the multimedia objects or a collection or group of multimedia objects may be stored in a repository such as the metadata database 372. Additionally and/or alternatively, the metadata may be stored in a local repository for metadata, such as electronic data store 385.

In one exemplary implementation, the metadata database 372 may include multiple databases that are configured to store different types of metadata. For example, one metadata database may be configured to store the metadata associated with the electronic message containing the attached and/or embedded multimedia object and a separate metadata database may be configured to store the metadata associated with the attached and/or embedded multimedia object. The multiple metadata databases may be linked to one another and configured such that when a multimedia object is subsequently accessed (e.g., from the multimedia object repository 380) that the associated metadata from the multiple metadata databases also is made accessible.

In one exemplary implementation, the multimedia object process server 370 is configured to make a representation of the multimedia object (e.g., a thumbnail). The representation of the multimedia object is associated with the actual multimedia object and may be used for subsequent access to, representation of, and selection of the actual multimedia object.

In one exemplary implementation, the multimedia object process server 370 is configured to determine whether a multimedia object that is being sent and/or received in an electronic message is already stored in a repository. If the multimedia object is already stored in a repository, then the multimedia object may not be stored again. This prevents duplicate multimedia objects from being stored multiple times, especially multimedia objects that are embedded and/or attached in numerous electronic messages. If the multimedia object is not already stored in a repository, then the multimedia object is stored in a repository.

The multimedia access server 374 is configured to enable a user to access the multimedia objects that have been saved in a repository for subsequent access and/or use.

Figure 4A:
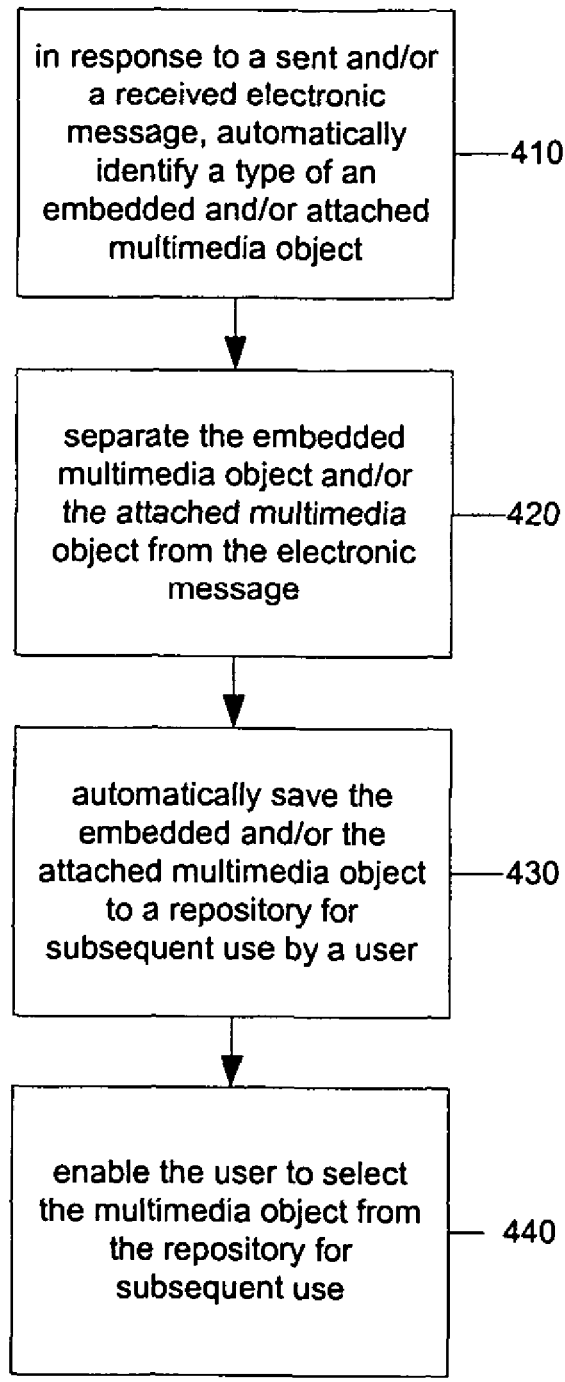
FIGS. 4A and 4B are flow charts of an exemplary process for handling a multimedia object associated with an electronic message.

Referring to FIG. 4A, a process 400 is illustrated for automatically identifying and saving communicated multimedia objects to a repository for subsequent use by a user. In response to a sent electronic message and/or a received electronic message, automatically identifying an embedded and/or attached multimedia object (step 410). The embedded and/or the attached multimedia object is separated from the electronic message (step 420). The multimedia object is automatically saved to a repository separate from the electronic message for subsequent use by a user (step 430). The user is then able to select the multimedia object from the repository for subsequent use (step 440).

Automatically identifying an embedded and/or attached multimedia object (step 410) includes identifying electronic messages that contain an embedded and/or an attached multimedia object. If the electronic message contains an embedded and/or attached file, then processing continues to automatically save the embedded and/or attached multimedia object. If the electronic message does not contain an embedded and/or an attached multimedia object, then the electronic message may be delivered to its destination without additional processing from process 400.

In one exemplary implementation, automatically identifying an embedded and/or attached multimedia object (step 410) may include automatically determining a type of the multimedia object and the multimedia object may be automatically saved or not saved to the repository based on the determination of the type of the multimedia object. Automatically identifying an embedded and/or attached multimedia object (step 410) may be based on default criteria or on criteria set by the user. In one exemplary implementation, all embedded and/or attached multimedia objects that are identified may be saved. In another exemplary implementation, the user may be presented with a choice and/or suggestions of the types of multimedia objects to save.

For instance, for a user that does not want to save non-picture images, the criteria may be to not save embedded and/or attached files that include file types that indicate non-picture images. For instance, in an electronic message that includes a non-picture image (e.g., an emoticon) as an attached and/or embedded multimedia object, the non-picture image may not be sent to a repository for storage and subsequent use based on identifying the file type as a non-picture image. On the other hand, in an electronic message that includes an attached and/or embedded picture image (e.g., digital photograph), the picture image may be automatically saved in a repository for subsequent use based on identifying the file type as a picture image. In one exemplary implementation, the multimedia object process server 370 of FIG. 3 may include the logic to determine a type of the multimedia object, and, based on that determination, decide whether that particular type of multimedia object should be sent to a repository for storage and subsequent use.

In another exemplary implementation, other criteria may be used to determine whether or not the multimedia object should be automatically saved in the repository, such as, for example, e-mail suspicious of being or actually being spam and a size of the multimedia object. For example, if the electronic message is an e-mail that is unread in a spam folder, then any attached and/or embedded multimedia object may not be automatically saved. If the multimedia object is an image, the size of the image may be used to determine whether or not to automatically save the image to the repository. For instance, if the one of the dimensions of the image is smaller than a configurable threshold number of pixels, then the image may not be automatically saved.

Figure 4B:
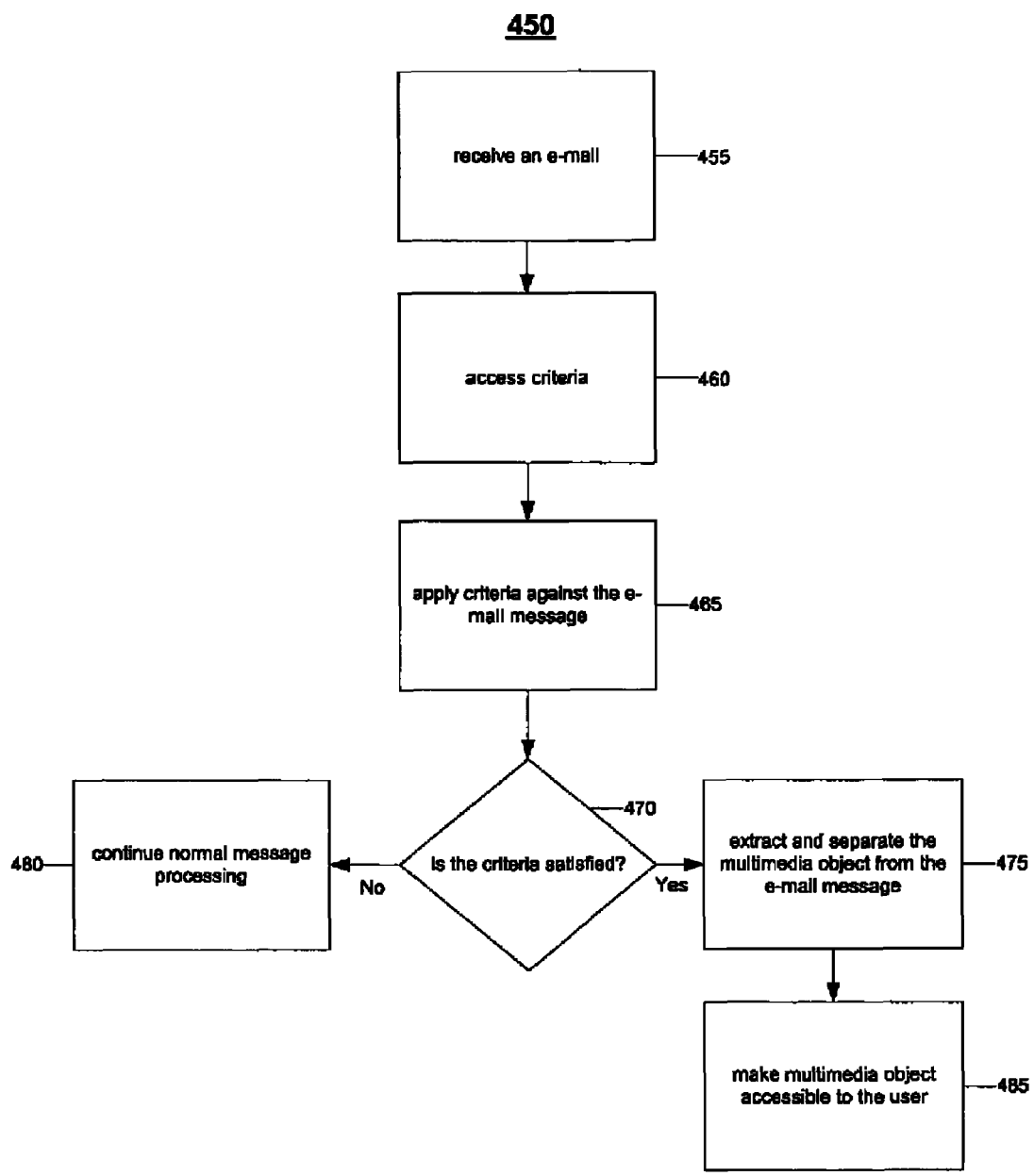

Referring to FIG. 4B, an exemplary process 450 is illustrated for automatically identifying and saving an attached and/or embedded multimedia object that is associated with an e-mail that has either been sent by a user or has been received by a user. The e-mail, which has either been sent from the user or has been set to a user, is received at a server (e.g., multimedia object process server 370 of FIG. 3) (step 455). A list of criteria of interest may be accessed (step 460). The list of criteria of interest may include default and/or user-selected settings to that provides criteria to be applied against e-mails received at the server (step 465).

For example, the criteria to apply may include one or more of the following default and/or user-selected criteria. The criteria may include saving only embedded multimedia objects, saving only attached multimedia objects, saving only multimedia objects (e.g., images, audio, video), saving only images of a certain type, saving only non-multimedia objects (e.g., user-specified characters), saving only objects from received from and/or sent to specific sources (e.g., the sources are on a "white" list), and saving all objects expect those that are received from and/or set to specific sources (e.g., the sources are on a "black" list).

The criteria is applied to the received e-mail message (step 465). If the criteria is satisfied (step 470), the multimedia object is extracted and separated from the e-mail message (step 475). If the criteria is not satisfied (step 465), the e-mail message may continue being processed to its destination (step 480). The multimedia object is then made accessible to the user (step 485).

Referring back to FIG. 4A, once the multimedia object is automatically saved to a repository (step 430), the user may send the multimedia object to other users using a GUI (step 440). In one exemplary implementation, a GUI may be used to send the multimedia object to other users from multiple applications that are given access to the repository using a GUI that is common to the multiple applications. For example, if there is an embedded image that is received in an e-mail, then the embedded image is automatically saved to a repository. The user may subsequently use that saved image by using a GUI that enables access to the image in the repository from an application other than e-mail, such as instant messaging. One benefit of automatically saving the image that was sent in e-mail to a repository is that the user can reuse the image in an instant messaging application without having to go through the hassle of opening the e-mail with the image, selecting the image to be saved, saving the image or dragging the image to the instant message. Instead, the image is automatically saved from the e-mail and is saved to a repository that includes other images, all of which are available for viewing and use from a GUI that is common to multiple different applications.

When the repository is a central repository and the multimedia objects are saved to the central repository, the user can access the saved multimedia objects from any computing device that can access the central repository. For example, the user could access the central repository from any device that has access to the Internet.

Additionally, when the repository is a central repository and the multimedia objects are save to the central repository, the user can easily reuse the multimedia objects across multiple applications without have to upload the multimedia object to each different application.

In one exemplary implementation, the user can perform numerous actions with the multimedia objects that were automatically saved. For example, the user can insert the multimedia object in other electronic messages (e.g., e-mails and instant messages) and designate the multimedia object to be made available on a network, such as, made available on a web page on the Internet.

In one exemplary implementation, if the multimedia object is an image, the user can order prints of the image, add it to a screensaver, add it to a calendar, designate the image to be used in an online album, create an album, view an album, and other actions.

Figure 5:
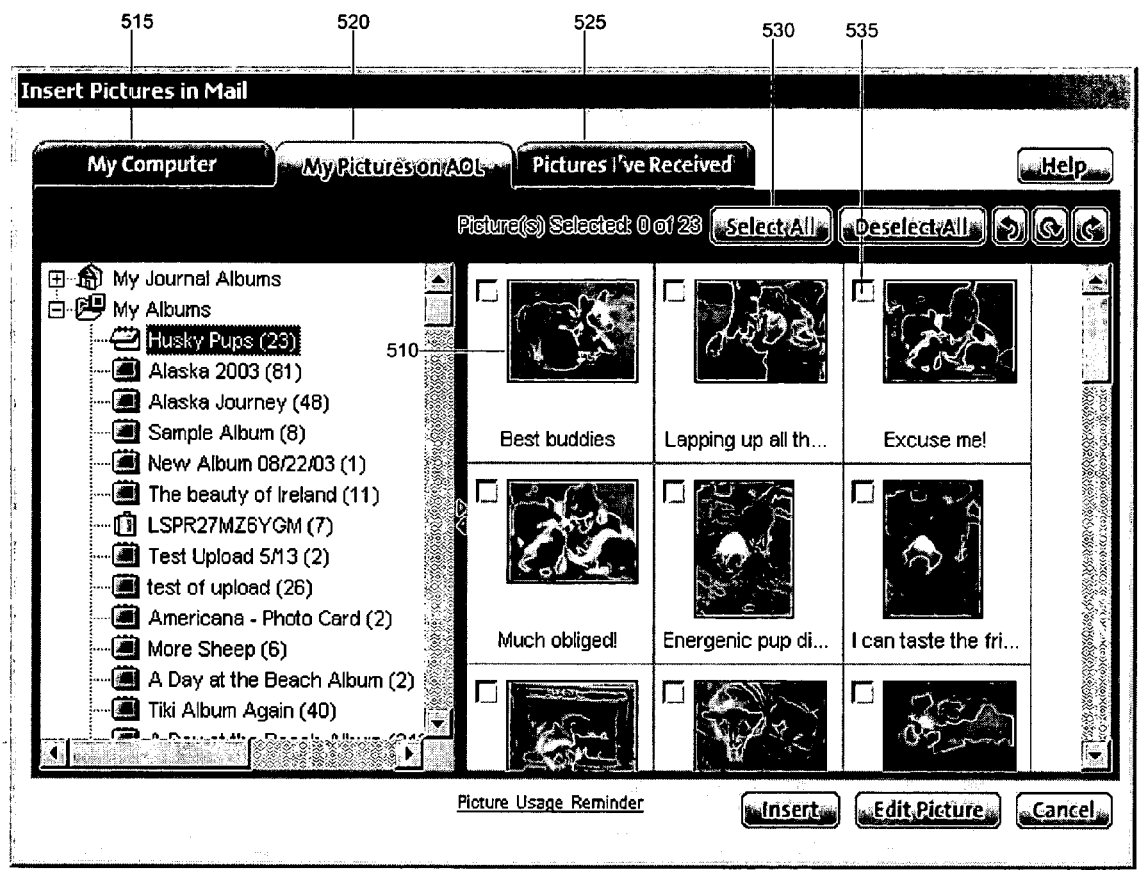
FIG. 5 is an illustration of an interface for selecting and using multimedia objects.

In one exemplary implementation, a common GUI enables the user to access the multimedia objects that were automatically stored and saved in the repository and to use those multimedia objects in multiple different applications using the common GUI. Additionally, the GUI may be used to add other multimedia objects to the repository. Referring to FIG. 5, an exemplary GUI 500 is illustrated where the multimedia objects in this exemplary screen shot are images 510. In one implementation, the images 510 may be organized by tabs 515, 520, and 525. The images may be selected as group using the "Select All" button 530 or one or more images may be selected individually using the checkboxes 535.

The GUI 500 may be used to use the images 510 in multiple different applications. The types of applications may include, for example, an e-mail application, an instant messaging application, a web page publishing application, an application having a directory of members or users, a calendar application, a journal application, and other types of applications.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

For example, although the document above focuses on operations performed on embedded and/or attached multimedia objects, the various implementations of the systems and processes may be performed on any type of embedded and/or attached object, including objects other than multimedia objects. For example, a non-multimedia object may include a one or more user-specified characters.

What is claimed is:

1. A method of automatically saving communicated multimedia objects to a repository for subsequent use, the method comprising:
    identifying an incoming or outgoing electronic message intended for a destination;
    identifying an embedded multimedia object embedded within the identified electronic message or an attached multimedia object attached to the identified electronic message;
    delivering, by one or more processors, the electronic message to the destination with an un-altered, viewable version of the identified multimedia object and automatically saving the un-altered, viewable version of the identified multimedia object to a repository for subsequent use by a user; and
    enabling the user to select the multimedia object from the repository for subsequent use.

2. The method as in claim 1 wherein the repository includes a central repository.

3. The method as in claim 1 wherein the repository includes a local repository.

4. The method as in claim 1 further comprising:
    determining a type of the multimedia object; and
    automatically saving the multimedia object to the repository based on the determination of the type of the multimedia object.

5. The method as in claim 1 further comprising:
    identifying a second incoming or outgoing electronic message intended for a second destination;
    identifying a second embedded multimedia object embedded within the identified second electronic message or a second attached multimedia object attached to the identified second electronic message;
    determining a type of the second multimedia object; and
    delivering the second electronic message to the second destination with an un-altered, viewable version of the identified second multimedia object and automatically not saving the un-altered, viewable version of the identified second multimedia object to the repository based on the determination of the type of the second multimedia object.

6. The method as in claim 5 wherein the type of the multimedia object includes a non-picture image.

7. The method as in claim 6 wherein the non-picture image includes an emoticon.

8. The method as in claim 1 wherein the multimedia object includes an image.

9. The method as in claim 8 wherein the image includes a picture.

10. The method as in claim 1 wherein the multimedia object includes a music file.

11. The method as in claim 1 wherein the multimedia object includes a video file.

12. The method as in claim 1 wherein enabling the user to select the multimedia object from the repository for subsequent use includes enabling the user to send the multimedia object to other users using a graphical user interface.

13. The method as in claim 1 wherein enabling the user to select the multimedia object from the repository for subsequent use includes enabling the user to send the multimedia object to others across multiple applications using a graphical user interface that is common to the multiple applications.

14. The method as in claim 13 wherein the multiple applications include an instant messaging application.

15. The method as in claim 13 wherein the multiple applications include a member directory.

16. The method as in claim 13 wherein the multiple applications include a web page publishing application.

17. The method as in claim 1 wherein the automatically saved multimedia object is available for use across multiple applications using a graphical user interface that is common to the multiple applications.

18. The method as in claim 17 wherein the multiple applications include an instant messaging application.

19. The method as in claim 17 wherein the multiple applications include a member directory.

20. The method as in claim 17 wherein the multiple applications include a web page publishing application.

21. The method as in claim 1 wherein the incoming or outgoing electronic message includes electronic mail.

22. The method as in claim 1 wherein enabling the user to select the multimedia object from the repository for subsequent use includes enabling the user to select and use the multimedia object in multiple applications without having to upload the multimedia object to the repository.

23. The method as in claim 1 further comprising:
    prior to automatically saving the multimedia object, determining whether the multimedia object is stored in the repository; and
    automatically saving the multimedia object in the repository if the multimedia object is not stored in the repository based on the determination.

24. The method as in claim 1 further comprising:
    identifying a second incoming or outgoing electronic message intended for a destination;
    identifying a second embedded multimedia object embedded within the identified second electronic message or a second attached multimedia object attached to the identified second electronic message;
    prior to automatically saving the second multimedia object, determining whether the second multimedia object is stored in the repository; and
    delivering the second electronic message to the second destination with an un-altered, viewable version of the identified second multimedia object and automatically not saving the un-altered, viewable version of the identified second multimedia object in the repository if the second multimedia object is stored in the repository based on the determination.

25. The method as in claim 1 wherein the repository is distinct from a structure for delivering the electronic message to the destination.

26. An apparatus comprising a non-transitory computer readable medium having instructions stored thereon that when executed by a machine result in at least the following:
identifying an incoming or outgoing electronic message intended for a destination;
identifying an embedded multimedia object embedded within the identified electronic message or an attached multimedia object attached to the identified electronic message;
delivering the electronic message to the destination with an un-altered, viewable version of the identified multimedia object and automatically saving the un-altered, viewable version of the identified multimedia object to a repository for subsequent use by a user; and
enabling the user to select the multimedia object from the repository for subsequent use.

27. A method of automatically saving communicated multimedia objects, the method comprising:
identifying electronic messages intended for multiple, different destinations;
identifying embedded multimedia objects embedded within the identified electronic messages or attached multimedia objects attached to the identified electronic messages;
delivering, by one or more processors, the electronic messages to the multiple destinations with un-altered, viewable versions of the identified multimedia objects and automatically saving the un-altered, viewable versions of the identified multimedia objects to a single repository;
associating, by the one or more processors, each of the un-altered, viewable versions of the identified multimedia objects with a user account in the repository; and
enabling access to the multimedia object from the repository based on the user accounts.

28. A method comprising:
identifying an incoming or outgoing electronic message intended for a destination;
identifying an embedded multimedia object embedded within the identified electronic message or an attached multimedia object attached to the identified electronic message;
automatically saving, by one or more processors and separate from the electronic message, the identified multimedia object to a repository for subsequent use by a user; and
enabling, by the one or more processors, the user to select the multimedia object from the repository for subsequent use without having to open the electronic message within which the multimedia object was identified.

29. The method as in claim 28 wherein the repository includes a central repository.

30. The method as in claim 28 wherein the repository includes a local repository.

31. The method as in claim 28 further comprising:
determining a type of the multimedia object; and
automatically saving, separate from the electronic message, the multimedia object to the repository based on the determination of the type of the multimedia object.

32. The method as in claim 28 further comprising:
identifying a second incoming or outgoing electronic message intended for a second destination;
identifying a second embedded multimedia object embedded within the identified second electronic message or a second attached multimedia object attached to the identified second electronic message;
automatically saving, separate from the second electronic message, the identified second multimedia object to a second repository for subsequent use by a second user; and
enabling the second user to select the second multimedia object from the second repository for subsequent use without having to open the second electronic message within which the second multimedia object was identified.

33. The method as in claim 28 wherein enabling the user to select the multimedia object from the repository for subsequent use includes enabling the user to send the multimedia object to other users using a graphical user interface.

34. The method as in claim 28 wherein enabling the user to select the multimedia object from the repository for subsequent use includes enabling the user to send the multimedia object to others across multiple applications using a graphical user interface that is common to the multiple applications.

35. The method as in claim 34 wherein the multiple applications include an instant messaging application.

36. The method as in claim 28 wherein enabling the user to select the multimedia object from the repository for subsequent use includes enabling the user to select and use the multimedia object in multiple applications without having to upload the multimedia object to the repository.

37. The method as in claim 28 wherein automatically saving the identified multimedia object to a repository for subsequent use by a user includes:
determining whether the multimedia object is stored in the repository; and
automatically saving, separate from the electronic message, the identified multimedia object to a repository if the multimedia object is not stored in the repository based on the determination.

* * * * *